Patented Aug. 1, 1939

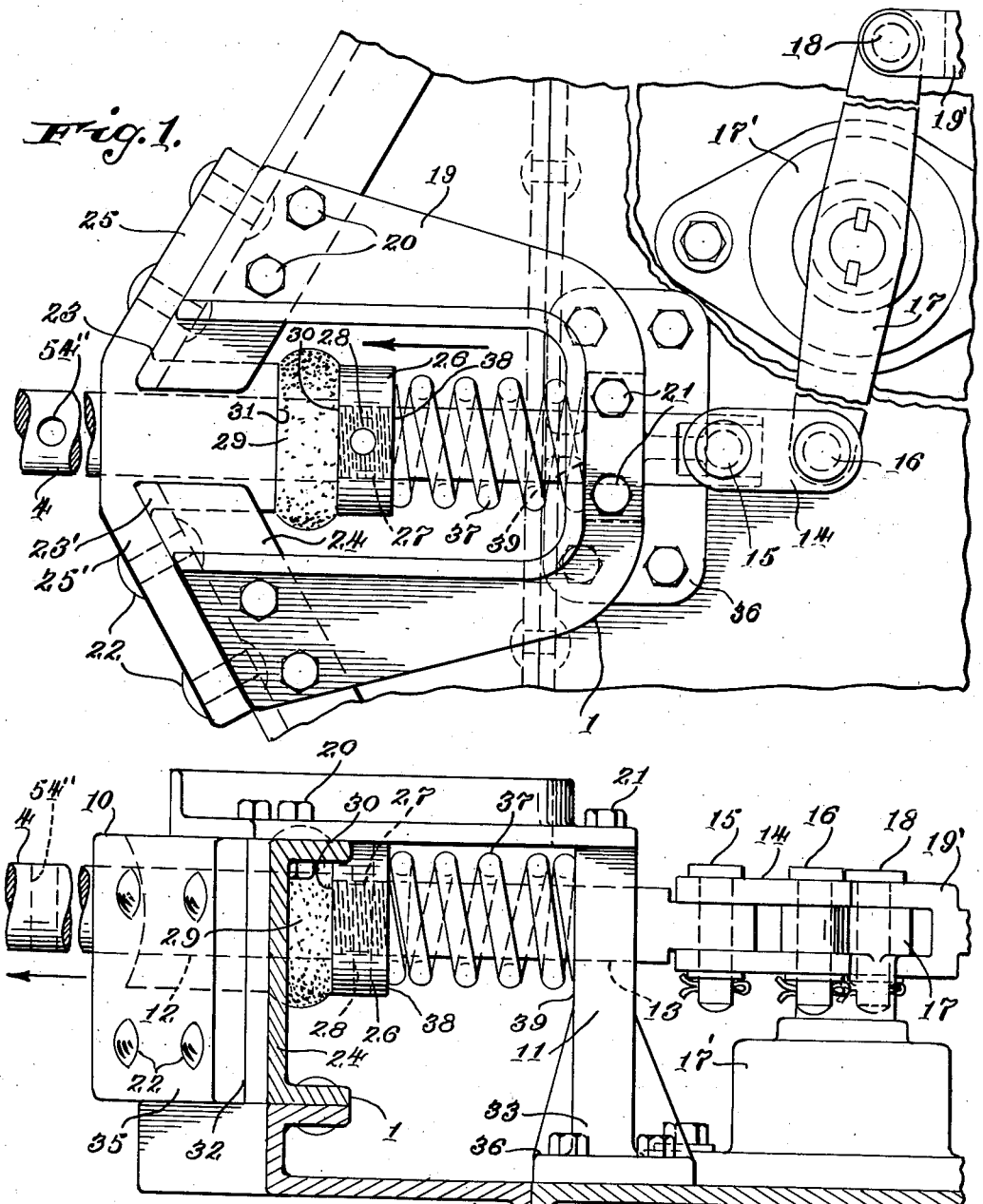

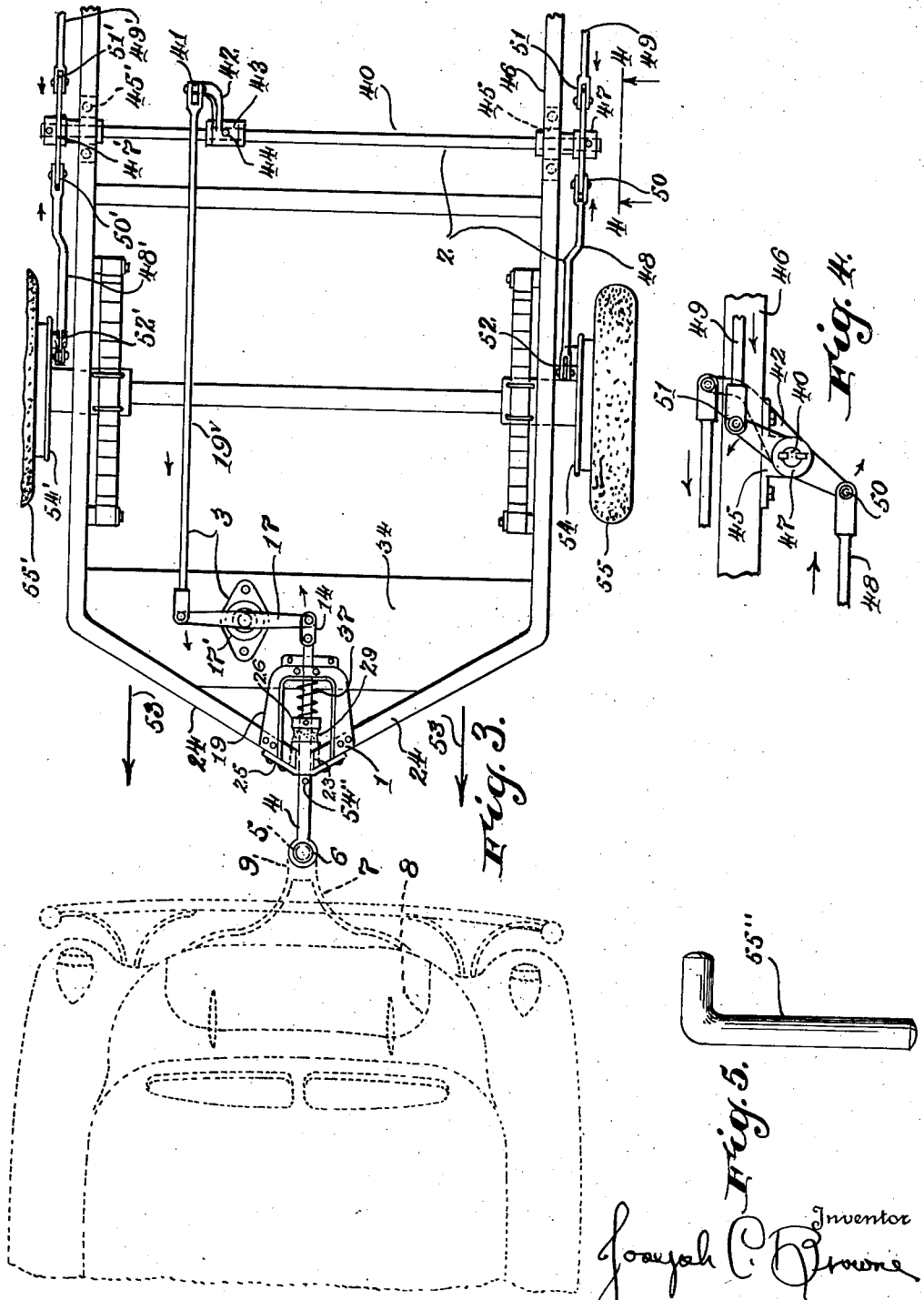

2,168,058

UNITED STATES PATENT OFFICE 2,168,058

AUTOMOTIVE TRAILER COUPLING

Joseph C. Browne, Philadelphia, Pa., assignor to Nathan Posner, Baltimore, Md.

Application June 30, 1937, Serial No. 151,079

2 Claims. (Cl. 188—142)

The present invention relates to improvements in couplers particularly of the type used to couple automotive vehicles to trailer vehicles.

Certain improvements relate specifically to providing a coupler of this type and purpose, whereby the same will be engaged with the respective braking system or equipment of the trailer vehicle on which the coupler is mounted, whereby certain characteristic thrusts and shocks thereto will cause the trailer vehicle brakes to function for purposes of retarding the travel and speed of the trailer.

Today's manufacturers of trailers, as commonly used for towing behind automobiles, are producing vehicles of this type on a very elaborate scale, thereby increasing their weight and bulk. These larger trailers usually carry sufficient equipment for providing comfortable living quarters for several persons or a small family. As a result of these improvements, the increased bulkiness and weight of these trailers have caused them to become unwieldy and difficult to control with safety while being towed. The tendency of this type of trailer is to crowd its respective tractor or automotive pulling or towing member, due to variation of speed between the two vehicles, the ratio of their respective weights, road conditions, sudden stops, road grades, etc. A free running trailer at times will be heavier than its respective towing member, whereby when being towed at normal road speeds will tend to push its towing vehicle off its true road course due to its "crowding" the towing member by its forwardly directed momentum thrust, thus endangering the safety of persons in both vehicles, the equipment thereof and the vehicles themselves, as well as causing a serious road hazard to passing motorists.

It is the purpose of the present invention to overcome this hazardous condition, and provide means whereby this type of trailer may be towed safely at normal road speeds without undue risk to life or equipment.

With these and other purposes and objects in view, the invention consists in certain other novel features of construction and combination of parts as will be more specifically set forth and described in the following specification and claims.

In the accompanying drawings, I have illustrated my improved trailer coupler structure, the same embodying the various features of my invention in their preferred form.

In the drawings:

Figure 1 is a fragmentary plan view of my improved form of trailer coupler structure.

Figure 2 is a similar view in elevation.

Figure 3 is a fragmentary plan view of a portion of a motor vehicle or tractor member coupled to a trailer vehicle, also shown fragmentarily, with my improved coupling structure shown in combination with a trailer braking system.

Figure 4 is a fragmentary view in elevation, of the trailer brake lever elements, as appears on the line 4—4 of Figure 3, of the trailer structure in the direction indicated by the arrows.

Figure 5 is a detail view in elevation of a pin member used when it is desired to prevent the trailer braking system from functioning through impulses from the coupler structure.

Referring to the drawings by reference numerals, each of which represents the same or similar elements throughout the various views, the invention consists of a coupling structure 1, linked to a trailer vehicle braking structure 2, through a system of lever members 3.

The coupler comprises a yielding bar member 4 having an eye 5, through which a coupling pin 6 may be inserted to securely engage the coupling bar member 4 to a coupling bracket structure 7 carried by the towing vehicle 8, which in turn may have a coupling pin engaging hole 9.

The coupling bar 4 is yieldingly supported in the forward and rear coupling bracket members 10 and 11, respectively, in holes 12 and 13, respectively, the same forming bearing and guide surfaces therefor. The rear end of the bar 4 is engaged to the trailer braking apparatus by the link pin and lever elements 14, 15, 16, 17 and 18, to be hereinafter described in detail.

For purposes of securely holding the bracket members 10 and 11 in their respective positions, the same are held in rigid relative position by the U shaped strap member 19, by screws 20 and 21, respectively, as indicated particularly in Figures 1 and 2. The bar bearing bracket 10 is securely fastened by rivets 22 to the front ends 23 and 23' of the trailer vehicle chassis frame structure 24, through the integral bracket wing or flange members 25 and 25'.

The coupling bar 4 is provided with a fixed collar member 26, for purposes of preventing the bar 4 from being pulled out and to form a fixed shoulder thereon, against which the towing strain is applied. This collar may be threadedly engaged to the bar member as indicated at 27, and held fast from turning by the pin 28. To provide resiliency to pulling or towing shocks a resilient rubber collar 29 or the like is interposed between the opposing faces 30 and 31 of the collar 26 and bracket 10, respectively. The brackets 10 and 11 are each securely fastened as to their lower portions 32 and 33, respectively, to the chassis reinforcing front plate structure 34, as indicated at 35 and 36, respectively.

When trailers are being towed at normal speeds on the highways any slowing up or stopping action on the part of the towing or tractor vehicle tends to cause the towed or trailer vehicle to crowd or move against the towing member, setting up a compressive force in the coupling element, and as applied to the present structure, this compressive force due to weight and momentum of the trailer, would be exerted against the bar member 4. For purposes of absorbing a greater portion of this shock a coil spring 37 is mounted on the bar 4, as shown between the opposing faces 38 and 39 of the collar 26 and bracket 11, respectively. For purposes of further reducing and absorbing this compressive shock and to prevent undue pushing and crowding of the towed trailer against its respective tractor element, and for purposes of actuating the trailer brake mechanism the towing or coupler bar 4, as hereinbefore referred to, is linked to the brake lever system 3, at its rear end by link member 14, retarder lever 17 to a pull rod 19', which in turn is engaged to the transverse brake lever actuating bar member 40, through pin and fork connection 41, with the crank or lever member 42, which in turn is fixed to the transverse bar 40 through its hub and pin members 43 and 44, respectively. The transverse brake bar member 40 is supported at its ends in bearing brackets 45 and 45' fixed to the trailer chassis or side frame structures 46 and 46', respectively. The bar 40 carries at its extreme ends and has fixed thereto the double crank members 47 and 47', the opposite ends of which are engaged to the longitudinal brake pull rods 48, 48', 49 and 49' by their respective fork and pin connecting elements 50, 50', 51 and 51'. The longitudinal brake pull rods 48 and 48', are connected to and actuate the brake drums 54 and 54' and their respective mechanisms, of the two front wheels 55 and 55', as shown through the brake drum levers 52 and 52', to which each of the said bars are connected, as shown. This brake lever actuating mechanism is substantially duplicated for the rear wheels through the respective bar members 49 and 49', which in this instance have not been shown.

For purposes of automatically applying the trailer brakes and retarding its forward momentum thrust when the trailer moves forward, and tends to crowd its respective tractor element or towing automotive vehicle, as indicated in fine dotted line at 8, the trailer moves against the tractor element in the direction of the arrows 53, thus causing the trailer coupler mechanism 1 to move forward over the pull rod or towing bar member 4, compressing the coupler coil spring 37, and moving the double crank or retarding lever member 17 in the direction of the arrows, as indicated in Figure 3. This movement produces a forward pull on the brake pull rod member 19, thereby applying the brakes through the brake lever mechanism as shown and indicated by the arrows in this figure. In this instance the application of the brakes is substantially in direct ratio with the weight of the trailer, the speed of travel and the resistance of the coupler spring member 37. However, to prevent a too quick and sudden application of the brakes in an instance of this character, the double lever member 17 is pivoted to a retarding element or device as indicated at 17', which may be of any desired type of hydraulic shock absorbing unit such as those universally used for absorbing and retarding automotive vehicle spring shocks and reactions thereof. Thus the quick action of the full sudden application of the brakes is retarded to a predetermined extent through the usual regulating valves for this type of unit. It is understood that any type of comparatively slow acting check device may be used at this point to advantage.

To provide means to render the braking mechanism inoperative, particularly when it is desirable to "back" the trailer through its respective tractor member, a hole 54'' is provided in the coupler bar member 4, in which a pin 55'', shown in Figure 5, may be inserted, thus preventing the coupler from moving up over the bar 4 when backing the vehicles up and preventing the application of the brakes in this instance.

I have thus described my invention in detail in order that the same may be fully understood as to detail of construction and the operation thereof. However, it is understood that the terms used herein are used in a descriptive sense only and not in a limiting manner, the scope of the invention being defined in the claims.

Having thus described my invention, what I claim as new is:

1. A trailer vehicle coupling adaptable for engagement with a tractor engaging member, the said coupling comprising a coupling connecting bar, having resilient engaging means for causing the said bar to absorb and yield to forwardly directed pulling shocks, and a spring member in combination therewith, for allowing the bar to absorb and yield to rearwardly directed shocks introduced thereto, a secondary thrust and shock absorbing member linked to the rearward end of the said connecting bar, said member providing means whereby both forwardly and rearwardly moving shocks and thrusts are dampened, the said last named member having means for linking the same with a vehicle braking apparatus, whereby predetermined thrust movements of the coupling bar member will actuate said braking apparatus.

2. A trailer vehicle coupling adaptable for engagement with a tractor engaging member, the said coupling comprising a connecting bar, brackets yieldingly supporting said bar, said bar having resilient engaging means to engage said brackets to absorb and yield to forwardly directed pulling shocks, means carried by the bar to retain the resilient means in active position, a spring member in combination therewith engaging the brackets and retaining means for allowing the bar to absorb and yield to rearwardly directed shocks introduced thereto, a secondary thrust and shock absorbing member linked to the rear end of said bar, said last named member providing means whereby both forwardly and rearwardly moving shocks and thrusts are dampened, the said last named member having means for linking the same with a vehicle braking apparatus, whereby predetermined thrusting movements of the bar member will actuate said braking means.

JOSEPH C. BROWNE.